(12) United States Patent
Kendra

(10) Patent No.: US 11,871,737 B2
(45) Date of Patent: Jan. 16, 2024

(54) FISHING LURE DEVICE WITH GEARS

(71) Applicant: Mark Kendra, Great Meadows, NJ (US)

(72) Inventor: Mark Kendra, Great Meadows, NJ (US)

(73) Assignee: Mark Kendra, Great Meadows, NJ (US)

( * ) Notice: Subject to any disclaimer, the term of this patent is extended or adjusted under 35 U.S.C. 154(b) by 511 days.

(21) Appl. No.: 16/857,019

(22) Filed: Apr. 23, 2020

(65) Prior Publication Data
US 2020/0352147 A1 Nov. 12, 2020

Related U.S. Application Data

(60) Provisional application No. 62/920,286, filed on Apr. 23, 2019.

(51) Int. Cl.
| | | |
|---|---|---|
| *A01K 85/12* | (2006.01) | |
| *A01K 85/10* | (2006.01) | |
| *F16H 1/28* | (2006.01) | |
| *A01K 85/00* | (2006.01) | |

(52) U.S. Cl.
CPC ............. *A01K 85/12* (2013.01); *A01K 85/10* (2013.01); *A01K 85/1873* (2022.02); *A01K 85/1877* (2022.02); *A01K 85/1883* (2022.02); *F16H 1/28* (2013.01)

(58) Field of Classification Search
CPC ...... A01K 85/10; A01K 85/12; A01K 85/122; A01K 85/125; A01K 85/128; A01K 85/18; A01K 85/1871; A01K 85/1873; A01K 85/1877; A01K 85/1881; A01K 85/1883; A01K 85/1887; A01K 85/1891; A01K 85/017; A01K 85/01; A01K 85/00
USPC ........... 43/42.11, 42.12, 42.13, 42.14, 42.15, 43/42.16, 42.17, 42.18, 42.19, 42.2, 42.31
See application file for complete search history.

(56) References Cited

U.S. PATENT DOCUMENTS

| | | | | |
|---|---|---|---|---|
| 798,836 | A * | 9/1905 | Sherbrook ............. | A01K 85/16 43/42.4 |
| 3,791,064 | A * | 2/1974 | Van Iseghem, Jr. ... | A01K 85/18 43/26.2 |
| 4,068,401 | A * | 1/1978 | Saitoh .................... | A63H 13/02 446/158 |
| 4,135,323 | A * | 1/1979 | Esten ..................... | A01K 85/01 43/42.31 |
| 4,163,338 | A * | 8/1979 | Lucarini ................ | A01K 85/01 43/42.31 |
| 4,569,147 | A * | 2/1986 | Margulis ................ | A01K 85/00 43/42.22 |
| 4,616,440 | A * | 10/1986 | Millroy .................. | A01K 85/12 43/42.12 |
| 4,674,223 | A * | 6/1987 | Pearce ................... | A01K 85/18 43/42.3 |
| 4,687,456 | A * | 8/1987 | Wang ..................... | A63H 31/00 446/158 |

(Continued)

*Primary Examiner* — Darren W Ark
*Assistant Examiner* — Kevin M Dennis

(57) ABSTRACT

A fishing lure device that produces an increased amount of energy imparted on attached fish-attracting devices by incorporating gears for rotating parts attached to the fish-attracting devices. The fishing lure device can include a first and second gear interacting with one another at a predetermined gear ratio for creating a desired rotation of the fish-attracting devices.

18 Claims, 5 Drawing Sheets

(56) References Cited

U.S. PATENT DOCUMENTS

| | | | | |
|---|---|---|---|---|
| 4,713,037 | A * | 12/1987 | Tong | A63H 13/12 |
| | | | | 446/156 |
| 4,831,767 | A * | 5/1989 | Pearce | A01K 85/18 |
| | | | | 43/42.3 |
| 4,832,650 | A * | 5/1989 | Tong | A63H 23/14 |
| | | | | 446/156 |
| 5,201,314 | A * | 4/1993 | Bosley, Jr. | A61L 31/14 |
| | | | | 600/431 |
| 5,428,916 | A * | 7/1995 | Dubriske | A01K 91/065 |
| | | | | 43/43.11 |
| D367,914 | S * | 3/1996 | Dubriske | D22/133 |
| 6,000,165 | A * | 12/1999 | Van Iseghem, Jr. | A01K 85/16 |
| | | | | 43/42.32 |
| 6,047,492 | A * | 4/2000 | Watson | A01K 85/01 |
| | | | | 43/42.31 |
| 6,108,961 | A * | 8/2000 | Milawski | A01K 85/12 |
| | | | | 43/42.11 |
| 6,427,375 | B1 * | 8/2002 | Hair, III | A01K 85/01 |
| | | | | 43/17.1 |
| 6,439,949 | B1 * | 8/2002 | Lucas | A63H 29/08 |
| | | | | 446/352 |
| 6,622,419 | B2 * | 9/2003 | Pearce | A01K 85/16 |
| | | | | 43/26.2 |
| 7,644,533 | B2 * | 1/2010 | Hair, III | A01K 85/12 |
| | | | | 43/42.31 |
| 10,555,511 | B2 * | 2/2020 | Vashina | A01K 85/00 |
| 2015/0216153 | A1 * | 8/2015 | Tsybulnyk | H02K 5/10 |
| | | | | 43/26.2 |
| 2017/0181417 | A1 * | 6/2017 | Tsybulnyk | A01K 97/06 |
| 2017/0280699 | A1 * | 10/2017 | Vashina | A01K 91/03 |
| 2018/0139942 | A1 * | 5/2018 | Varian | A01K 85/01 |

* cited by examiner

FISHING LURE DEVICE WITH GEARS

BACKGROUND OF THE INVENTION

Field of the Invention

The present invention relates to fishing lures in general, and more specifically, to a fishing lure device with gears for rotating the fishing lure in which the fishing lure device greatly increases the action of the fishing lure in order to attract more fish.

Description of the Related Art

Throughout the history of fishing, the art of attracting more fish has always been the goal of people who fish. The use of fabricated lures to catch more fish, for sport or for survival, has also evolved.

The fishing industry has higher demands of performance. Accordingly, there exists a need to provide a fishing lure with improved performance. It is desirable to provide fishing lure device with gears to rotate a fishing lure with improved action for attracting fish.

SUMMARY OF THE INVENTION

The present invention relates to a fishing lure device with gears incorporated with moving connecting parts for increasing the action of a fish attracting device. The fishing lure device includes a first and second gear interacting with one another at a predetermined gear ratio. The first gear can be larger than the second gear. The first and second gears produce movement of the fish attracting device. The moveable connecting parts rotate around a connecting frame. The connecting frame can include an arm and leg arrangement with eye hooks for attaching to a fishing line and fishing lure.

In one embodiment, one or more blades can be coupled to the first gear for producing movement of the first gear. A plurality of paddles can be coupled to the second gear for providing sound and vibration. The fishing lure device can produce a faster action with a predetermined gear ratio in order to impart a faster action of movement of the fish attracting device and generate more sound, vibration, and visual disturbance.

The action of the fishing lure device can be determined and adjusted by adjusting a size of the gears incorporated within the fishing lure device as the gears relate to each other, without increasing the speed of the retrieve of the fishing lure device. The present invention provides a fishing lure device that incorporates gears as a method of increasing revolution output and action of a lure without increasing a relative speed of retrieve. Applying a set of reduction gears and imparting a gear ratio to the action of the fishing lure device can greatly increase the visual attraction of the fishing lure device and also greatly increase its vibration and sound in the water upon retrieval, resulting in the attraction of more fish. The fishing lure device can include gears and a gear ratio within its moving parts for the method of greatly increasing the visual action and fish attracting capability without increasing a relatively standard speed of retrieve. The fishing lure device can include gears and a gear ratio within its moving parts for the method of greatly increasing the sound and vibrational action and fish-attracting capability of the fishing lure while it is retrieved through the water.

The present invention provides a fishing lure device for rotation of a fish attracting device that allows the user an opportunity to greatly increase the fish-attracting action and fish-attracting capability while maintaining a relatively standard speed of retrieve. The present invention also allows the user the ability to measure, calculate, and adjust the amount of action, by the method of measuring, adjusting, and changing different size gears as they relate to each other.

The rotation of the gears can create a grinding sound as the teeth of the gears contact each other for increasing vibration of the fishing lure device for attracting fish to the fishing lure device. During retrieval, the paddles of the fish attracting device can come at or near the surface of the water for creating vibration and sound for attracting fish to the fishing lure device.

The invention will be more fully described by reference to the following drawings.

BRIEF DESCRIPTION OF THE DRAWINGS

The drawings described herein are for illustration purposes only and are not intended to limit the scope of the present disclosure in any way.

DETAILED DESCRIPTION

Figure 1:
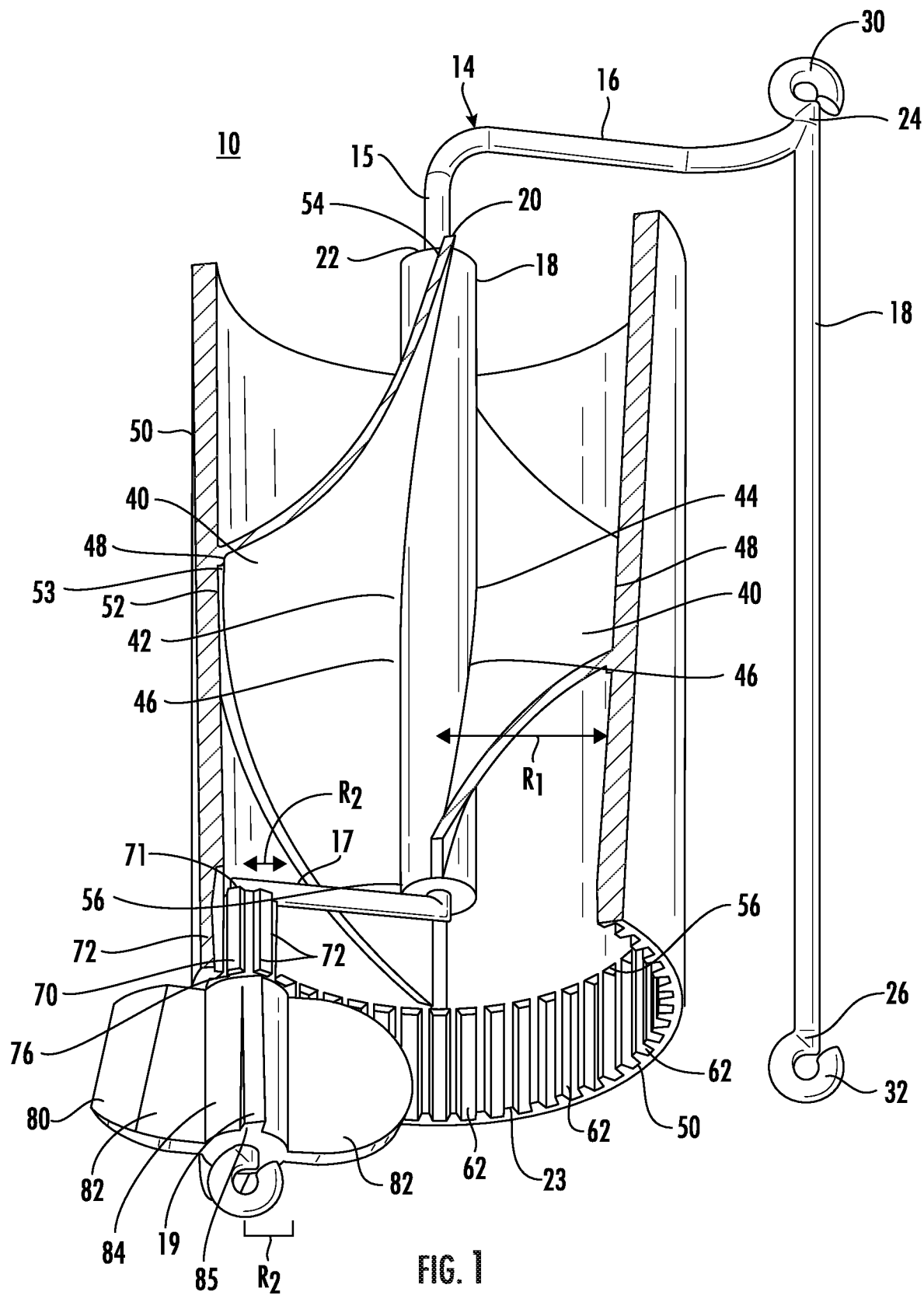
FIG. 1 is a perspective cross sectional view of a fishing lure device including movable connecting parts for attaching to a fish attracting device and being rotatable around an axis by using gears.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
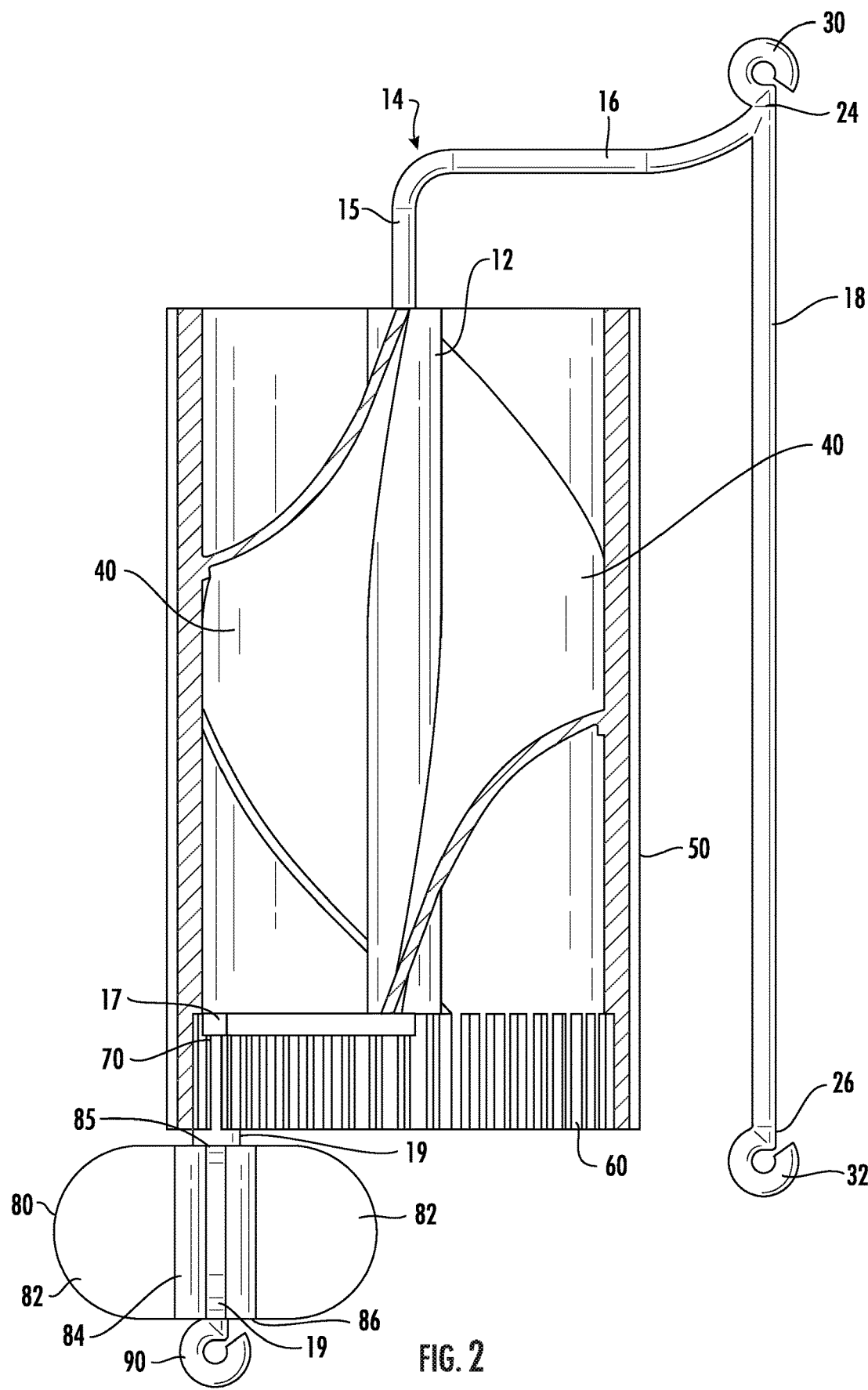
FIG. 2 is a front elevational cross sectional view of the fishing lure device including spiral fins attached to a rotating central shaft.
Figure 3:
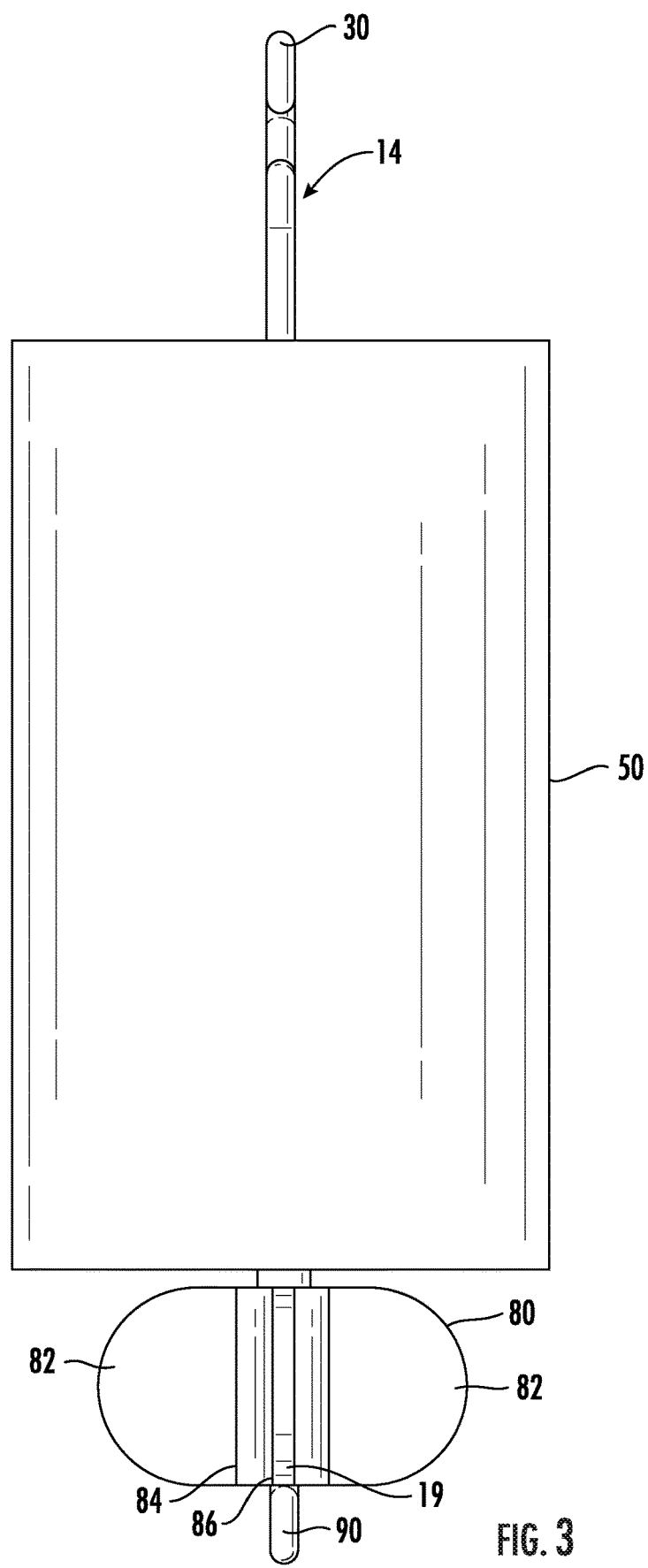
FIG. 3 is rear view of the fishing lure device.

FIGS. 1-3 illustrate fishing lure device 10 in accordance with the teachings of the present invention. Moveable connecting parts 11 include central shaft 12, first gear 60 and second gear 70. Central shaft 12 serves as a foundation and an axis of rotation for rotating movable connecting parts 11.

Connecting frame 14 can comprise central base 15, first arm 16, second arm 17, first leg 18 and second leg 19 with each adjacent part coupled or integral with each other. Central base 15 extends through aperture 20 within central shaft 12. First arm 16 can extend laterally from first end 22 of central base 15 to extend first arm 16 laterally from central shaft 12. Second arm 17 can extend laterally from second end 23 of central base 15 to extend second arm 17 laterally from central shaft 12. First leg 18 can extend downwardly from first arm 16. In one embodiment, first leg 18 extends perpendicular to first arm 16. Second leg 19 can extend downwardly from second arm 17. In one embodiment, second leg 19 extends perpendicular to second arm 17. In one embodiment, connecting frame 14 can be formed of stainless-steel, for example as a stainless-steel wire.

Eye hook 30 can be coupled or integral with end 24 of first leg 18. Eye hook 32 can be coupled or integral with end 26 of first leg 18. A fishing line can be attached to eye hook 30. A fish attracting device, such as a fishing lure or hook can be attached to eye hook 32.

Spiral fin 40 can be attached on both sides 42, 44 of central shaft 12. Spiral fin 40 can be flat. End 46 spiral fin 40 can be attached in a spiral along a length of central shaft 12. End 48 of spiral fin 40 can be attached to inner surface 52 of outer shell 50 at position 53. Each of spiral fins 40 can extend outwardly from end 54 and end 56 of central shaft 12 to meet at position 53.

First gear 60 can be positioned at end 56 of outer shell 50. First gear 60 includes a plurality of gear teeth 62. Gear teeth 62 extend around inner surface 52 of outer shell 50.

Second gear 70 can be positioned at end 71 of second arm 17. Second gear 70 includes a plurality of gear teeth 72. Gear teeth 72 extend around outer surface 74 of second gear support 75. Gear teeth 72 of second gear 70 engage gear teeth 62 of first gear 60 as shown in FIG. 2. Radius R1 of first gear 60 can be larger than radius R2 of second gear 70. First gear 60 having a larger radius can engage second gear 70 having a smaller radius to create a pre-determined gear ratio. For example, the gear ratio can be in the range of 10:1. In one embodiment, the gear ratio can be 4:1.

Fish attracting device 80 can be coupled to end 76 of second gear 70. Fish attracting device 80 can include a plurality of paddles 82 extending laterally from paddle base 84. Second leg 19 extends through aperture 85 within paddle base 84. Eye hook 90 can be coupled or integral with end 86 of second leg 19 as shown in FIG. 3. A fishing hook can be attached to eye hook 90.

Paddles 82 can expend energy onto second leg 19 during the retrieve. A greatly increased rotation speed of central shaft 12 is a result of first gear 60 being larger and turning second gear 70 being smaller for producing faster rotation of fish attracting device 80 for greatly increased fish-attracting action imparted on fish attracting device 80 without increasing a relative speed of retrieve as shown in FIG. 1. First gear 60 and second gear 70 can be adjusted in size to determine a position of gear teeth 62 and gear teeth 72 for adjusting the gear ratio to a predetermined gear ratio in order to provide a desired degree of action of fish attracting device 80.

Figure 4:
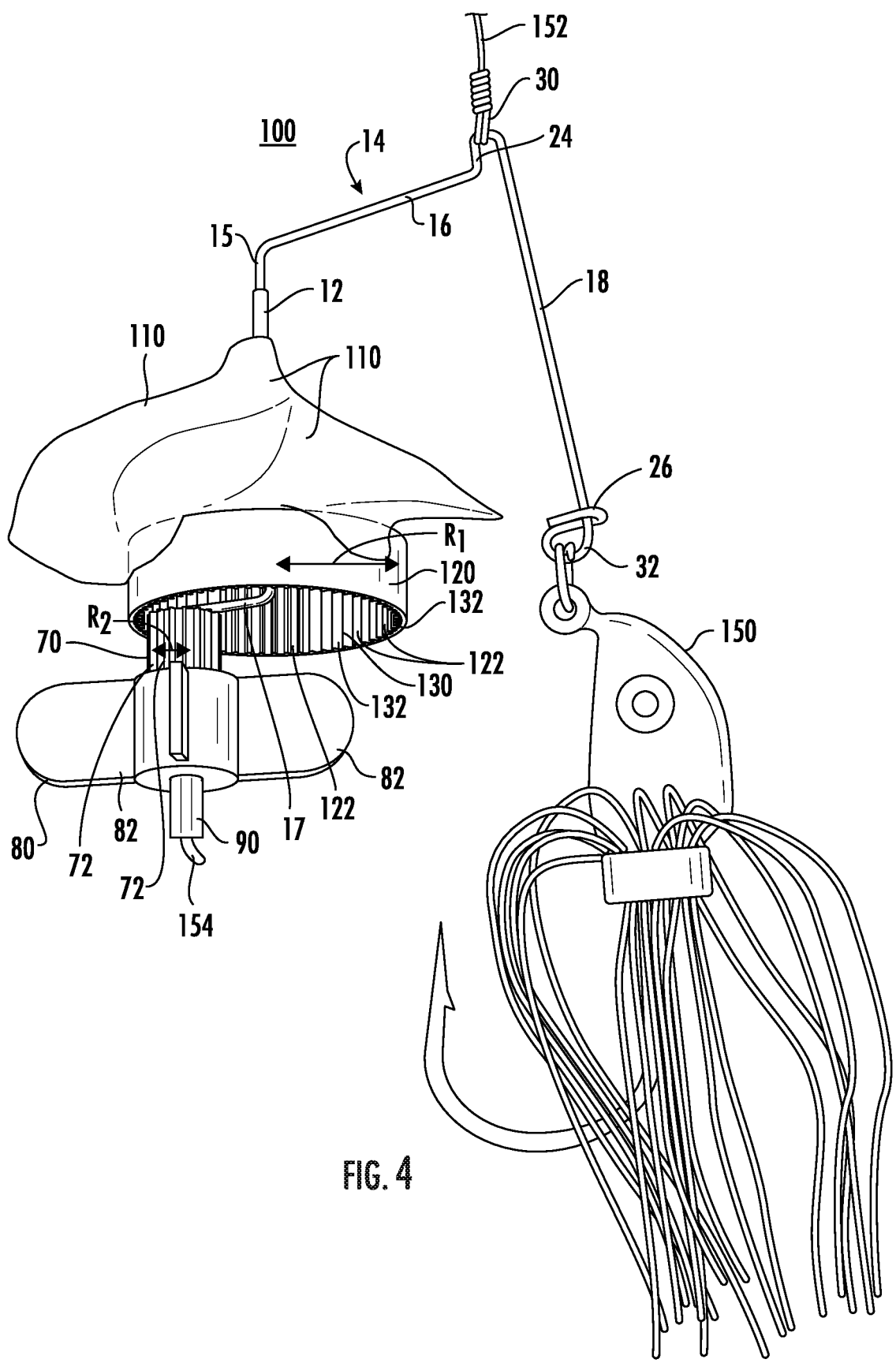
FIG. 4 is a schematic diagram of an embodiment of the fishing lure device and including an attached fishing lure.

FIG. 4 shows fishing lure device 100 including a plurality of blades 110 coupled to central shaft 12. Blades 110 extend outwardly from central shaft 12. Blades 110 can have a spiral shape. Blades 110 are positioned above outer shell 120. In one embodiment, blades 110 are formed of metal such as for example chrome. First gear 130 is positioned within outer shell 120. First gear 130 includes a plurality of gear teeth 132. Gear teeth 132 extend around inner surface 122 of outer shell 120. Gear teeth 72 of second gear 70 engage gear teeth 132 of first gear 130. Radius R1 of first gear 130 can be larger than radius R2 of second gear 70. First gear 130 having a larger radius can engage second gear 70 having a smaller radius to create a pre-determined gear ratio.

Fishing lure 150 is attached to eye hook 32. Alternatively, a fish hook is attached to eye hook 32. Fishing line 152 is attached to eye hook 30. Fish hook 154 is attached to eye hook 90. During use, fishing line 152 is retrieved to rotate blades 110 which in turn rotate central shaft 12 around central base 15 of connecting frame 14 to rotate first gear 60. First gear 60 engages second gear 70 for rotating fish attracting device 80. Paddles 82 of fish attracting device 80 are rotated by the rotation of second gear 70. The rotation of first gear 130 being larger and turning second gear 70 being smaller produces a faster rotation of fish attracting device 80 for greatly increased fish-attracting action imparted on fish attracting device 80 without increasing a relative speed of retrieve. First gear 130 and second gear 70 can be adjusted in size to determine a position of respective gear teeth 132 and gear teeth 72 for adjusting the gear ratio to a predetermined gear ratio in order to provide a desired degree of action of fish attracting device 80.

Figure 5:
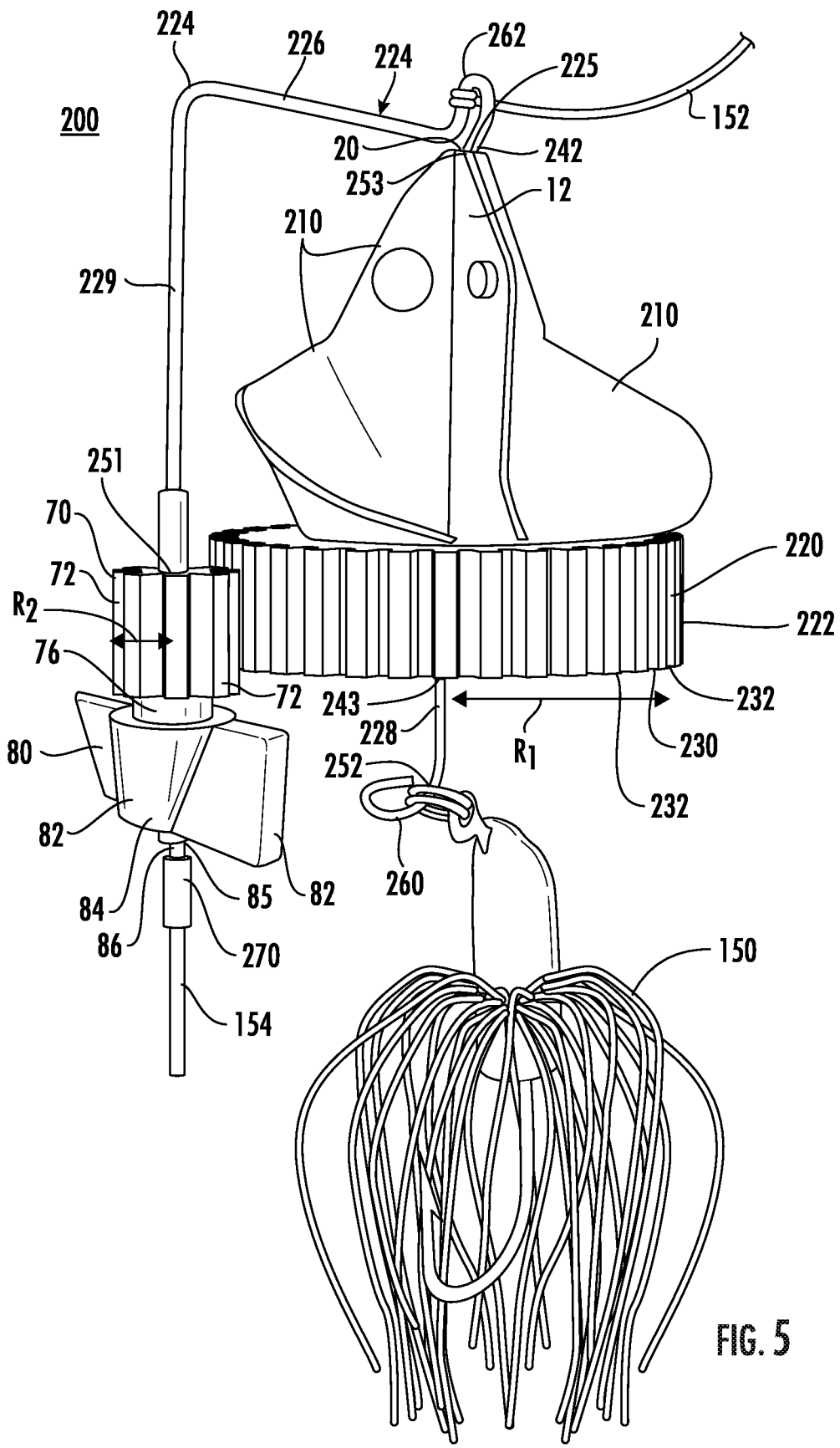
FIG. 5 is a schematic diagram of an embodiment of the fishing lure device and including an attached fishing lure.

FIG. 5 shows fishing lure device 200 including a plurality of blades 210 coupled to central shaft 12. Blades 210 extend outwardly from central shaft 12. Blades 210 can have a spiral shape. Blades 210 are positioned above outer shell 220. In one embodiment, blades 210 are formed of metal such as for example chrome. First gear 230 is positioned on outer surface 222 of outer shell 220. First gear 230 includes a plurality of gear teeth 232. Gear teeth 232 extend around outer surface 222 of outer shell 220.

Connecting frame 224 can comprise central base 225, first arm 226, first leg 228 and second leg 229 with each adjacent part coupled or integral with each other. Central base 225 extends through aperture 20 within central shaft 12. First arm 226 can extend laterally from first end 242 of central base 225 to extend first arm 226 laterally from central shaft 12. First leg 228 can extend downwardly from second end 243 of central base 225. Second leg 229 can extend downwardly from end 244 of first arm 226. In one embodiment, first leg 228 and second leg 229 extends perpendicular to first arm 226. In one embodiment, connecting frame 224 can be formed of stainless-steel, for example as a stainless-steel wire.

Second gear 70 can be positioned at end 251 of second leg 229. Fish attracting device 80 can be coupled to end 76 of second gear 70. Fish attracting device 80 can include a plurality of paddles 82 extending laterally from paddle base 84. Second leg 229 extends through aperture 85 within paddle base 84.

Gear teeth 72 of second gear 70 engage gear teeth 232 of first gear 230. Radius R1 of first gear 230 can be larger than radius R2 of second gear 70. First gear 230 having a larger radius can engage second gear 70 having a smaller radius to create a pre-determined gear ratio.

Eye hook 260 can be coupled or integral with end 252 of first leg 228. Eye hook 262 can be coupled or integral with end 253 of first arm 226. A fishing line 152 can be attached to eye hook 262. Fishing lure 150 can be attached to eye hook 260. Alternatively, a fish hook is attached to eye hook 260. Eye hook 270 can be coupled or integral with end 286 of second leg 229. Fish hook 154 is attached to eye hook 270.

During use, fishing line 152 is retrieved to rotate blades 210 which in turn rotate central shaft 12 around central base 15 of connecting frame 224 to rotate first gear 230. First gear 230 engages second gear 70 for rotating fish attracting device 80. Paddles 82 of fish attracting device 80 are rotated by the rotation of second gear 70. The rotation of first gear 230 being larger and turning second gear 70 being smaller produces a faster rotation of fish attracting device 80 for greatly increased fish-attracting action imparted on fish attracting device 80 without increasing a relative speed of retrieve. First gear 230 and second gear 70 can be adjusted in size to determine a position of respective gear teeth 232 and gear teeth 72 for adjusting the gear ratio to a predetermined gear ratio in order to provide a desired degree of action of fish attracting device 80.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A fishing lure device comprising a central shaft having an axis of rotation for a first gear engaged with the central shaft, a connecting frame extending through an aperture in the central shaft; and a second gear coupled to the connecting frame, the first gear and the second gear having a pre-determined gear ratio, the rotatable central shaft rotates the first gear, the first gear engaging the second gear for providing rotation of the second gear, wherein the connecting frame comprises a central base having a first arm connected laterally at one end and a second arm connected laterally at a second end, the central base extending through the aperture within the central shaft and wherein the connecting frame is adapted to attach to at least one fish attracting device and the pre-determined gear ratio increases action of the at least one fish attracting device during the rotation of the second gear.

2. The fishing lure device of claim 1 wherein the gear ratio is in a range of 10 to 1.

3. The fishing lure device of claim 1 wherein the gear ratio is in a range of 4 to 1.

4. The fishing lure device of claim 1 wherein the first gear includes a plurality of first teeth and the second gear includes a plurality of second teeth, wherein the plurality of first teeth engage the plurality of second teeth for increasing a rotation speed of the at least one fish attracting device.

5. The fishing lure device of claim 1 wherein a first leg extends downwardly from the first arm and a second leg extends downwardly from the second arm, the first leg being configured for attaching to a first one of the fish attracting devices and the second leg being configured for attaching to a second one of the fish attracting devices.

6. The fishing lure device of claim 5 wherein the first one of the fish attracting devices comprises a fishing lure.

7. The fishing lure device of claim 5 wherein the second one of the fish attracting devices comprises a plurality of paddles extending laterally from a paddle base, the second leg extends through an aperture within the paddle base, wherein rotation of the second gear rotates the paddle base for rotating the plurality of paddles.

8. The fishing lure device of claim 5 further comprising a pair of spiral fins attached at a first end on both sides of the central shaft in a spiral along a length of the central shaft.

9. The fishing lure device of claim 8 wherein each of the spiral fins extend outwardly from a first end and second end of the central shaft.

10. The fishing lure device of claim 8 wherein the second gear is positioned at an end of the second arm.

11. The fishing lure device of claim 8 wherein the second gear is positioned at a first end of the second arm, the second one of the fish attracting devices comprises a plurality of paddles extending laterally from a paddle base, the second leg extends through an aperture within the paddle base, wherein rotation of the second gear rotates the paddle base which rotates the plurality of paddles.

12. The fishing lure device of claim of claim 5 further comprising a plurality of blades extending outwardly from the central shaft, the plurality of blades causing rotation of the central shaft.

13. The fishing lure device of claim 12 wherein the plurality of blades have a spiral shape.

14. The fishing lure device of claim 12 further comprising an outer shell housing the central shaft, the outer shell being positioned below the plurality of blades, wherein the first gear is positioned on an inner surface of the outer shell and the second gear is positioned at an end of the second arm.

15. The fishing lure device of claim 5 wherein a first eye hook is positioned at a first end of the first leg and a second eye hook is positioned at a second end of the first leg.

16. The fishing lure device of claim 5 wherein an eye hook is positioned at an end of the second leg.

17. The fishing lure device of claim 1 wherein the pre-determined gear ratio is selected for increasing sound and vibrational action of the at least one fish attracting device while the at least one fish attracting device is retrieved through water.

18. A fishing lure device comprising a rotatable central shaft rotatable around an axis, a connecting frame extending through an aperture in the central shaft a first gear engaged with the central shaft; and a second gear coupled to the connecting frame, the first gear and the second gear having a pre-determined gear ratio, the rotatable central shaft rotates the first gear, the first gear engaging the second gear for providing rotation of the second gear, wherein the connecting frame comprises a central base having a first arm connected laterally at one end, the central base extending through an aperture within the central shaft, a first leg extends downwardly from the first arm and a second leg extends downwardly from the central base, the first leg being configured for attaching to a first one of the fish attracting devices and the second leg being configured for attaching to a second one of the fish attracting devices, a plurality of blades extending outwardly from the central shaft, the plurality of blades causing rotation of the central shaft, the second gear is positioned at an end of the second leg, the second one of the fish attracting devices comprises a plurality of paddles extending laterally from a paddle base, the second leg extends through an aperture within the paddle base, wherein rotation of the second gear rotates the paddle base which rotates the plurality of paddles and wherein the connecting frame is adapted to attach to at least one fish attracting device and the pre-determined gear ratio increases action of the at least one fish attracting device during the rotation of the second gear.

* * * * *